(12) United States Patent
Glas

(10) Patent No.: US 7,896,764 B2
(45) Date of Patent: Mar. 1, 2011

(54) TRANSMISSION BEARING NOISE ATTENUATION DEVICE

(75) Inventor: Ronald Glas, Achern (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 494 days.

(21) Appl. No.: 10/819,894

(22) Filed: Apr. 7, 2004

(65) Prior Publication Data

US 2004/0258338 A1 Dec. 23, 2004

(30) Foreign Application Priority Data

Apr. 7, 2003 (DE) .................................. 103 15 824

(51) Int. Cl.
*F16H 55/56* (2006.01)
(52) U.S. Cl. ............................................. 474/8
(58) Field of Classification Search .............. 474/8, 18, 474/28; 384/535, 536, 581, 582
See application file for complete search history.

(56) References Cited

U.S. PATENT DOCUMENTS

| | | | | |
|---|---|---|---|---|
| 5,062,721 | A * | 11/1991 | Chiba | 384/536 |
| 6,126,324 | A * | 10/2000 | Ponson et al. | 384/612 |
| 6,322,466 | B1 * | 11/2001 | Eidloth | 474/8 |
| 6,361,456 | B1 * | 3/2002 | Walter | 474/18 |
| 6,478,702 | B2 * | 11/2002 | Borghi et al. | 474/37 |
| 7,223,020 | B2 * | 5/2007 | Bauer et al. | 384/535 |
| 7,478,952 | B2 * | 1/2009 | Faust et al. | 384/536 |

FOREIGN PATENT DOCUMENTS

| | | | |
|---|---|---|---|
| DE | 3711406 A1 | * | 10/1988 |
| DE | 10203307 A1 | * | 8/2002 |
| SU | 1362879 A | * | 12/1987 |

* cited by examiner

*Primary Examiner* — Vicky A Johnson
(74) *Attorney, Agent, or Firm* — Alfred J. Mangels

(57) ABSTRACT

A transmission noise attenuation device for a bearing assembly of a belt-driven conical-pulley transmission having a chain that serves as an endless torque-transmitting device. A shaft is rotatably supported in a bearing that includes a bearing outer ring with a cylindrical outer surface, wherein the bearing is supported in a bearing housing. At least one cam ring is positioned between the bearing housing inner surface and the bearing outer ring outer surface. The cam ring is elastically deformable to allow limited radial movement between the bearing housing inner surface and the bearing outer ring outer surface.

15 Claims, 4 Drawing Sheets

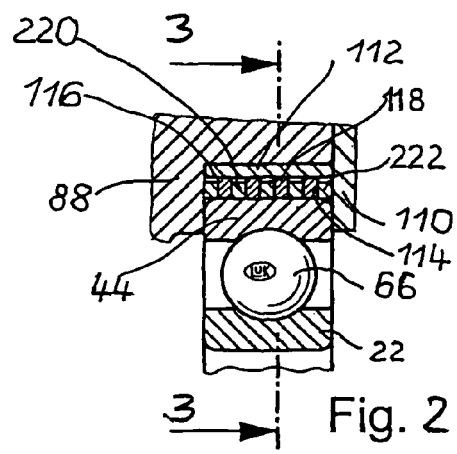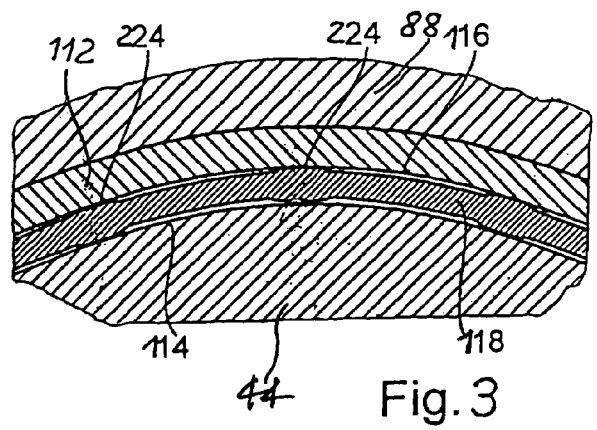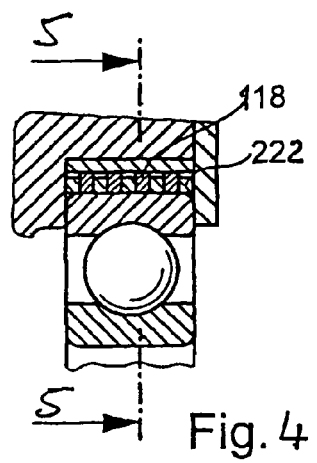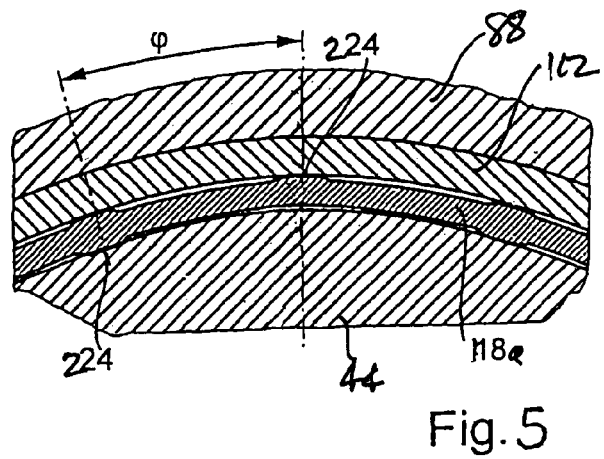

TRANSMISSION BEARING NOISE ATTENUATION DEVICE

BACKGROUND OF THE INVENTION

1. Field of the Invention

The present invention relates to a belt-driven conical-pulley transmission, such as a continuously variable transmission, having an endless torque-transmitting means in the form of a drive chain, as well as to a noise attenuation device for a shaft bearing supported in a bearing housing. The invention also relates to a cam ring structure for a noise attenuation arrangement.

2. Description of the Related Art

The requirement for comfort in automobiles is generally very high, also particularly with regard to acoustics. Especially for luxury automobiles, the driver and passengers wish to prevent any disturbing noise originating as a result of operation of the automobile power train. However, internal combustion engines and other power train components, such as transmissions, do create noises that can generally be perceived as constituting a disturbance. In continuously variable transmissions, the use of a plate-link chain can lead to the production of noise, because a plate-link chain, by virtue of its structure with links and pins, creates a repetitive knocking noise during operation of the transmission when the pins strike the conical disks of the transmission.

Belt-driven conical-pulley transmissions with a continuously variable transmission ratio include two pairs of conical disks located on shafts that are spaced from each other and around which an endless torque-transmitting means frictionally engages the conical surfaces of the pairs of conical disks. The transmission ratio of the transmission can be continuously modified by opposite changes of the spacings between the pairs of conical disks. Metallic chains are particularly used as endless torque-transmitting means in transmissions in which high torques can be transmitted, for example torque levels in the range of 300 Nm and higher.

Radially-undulating springs are currently used for vibration isolation of loaded rotation bearings. However, they have the disadvantage that as a result of their spring deflection, a displacement of the shaft as a function of the load is induced. That can lead on the one hand to loads that are so great as to damage components in contact with it, and on the other hand to an increase in noise production.

An additional disadvantage is the fact that the cam height on the inner radius and the perimeter of such radially-undulating springs are different. Manufacturing conditions result in tolerances. The addition of the tolerances is superimposed on the load-dependent displacement resulting from the spring deflection as a static positioning error, whereby the total tolerance in the position of the shaft relative to the housing becomes very large.

An object of the invention is the reduction of noise transmission, especially structure-borne noise transmission from the conical disks in a motor vehicle by the elimination of the load-dependent displacement of the shafts, while keeping the necessary manufacturing costs required for that purpose as low as possible.

SUMMARY OF THE INVENTION

Briefly stated, in accordance with one aspect of the present invention, the object is achieved by means of a noise attenuation device for a shaft bearing supported in a bearing housing of a belt-driven conical-pulley transmission having a chain as an endless torque-transmitting means. This noise attenuation device includes a bearing outer ring having an outer surface defined by a circular cylinder and within which a shaft is supported. The bearing outer ring is rigidly positioned within the bearing housing, wherein the inner surface of the bearing housing surrounds the outer surface of the bearing outer ring. Between the inner surface of the bearing housing and the outer surface of the bearing outer ring at least one cam ring is arranged that by elastic deformation allows limited radial movement between the inner surface and the outer surface.

Advantageous embodiments and further developments of the inventive noise attenuation device are set forth below by way of example, whereby the examples are not to be considered as limiting.

At least two adjacent cam rings are axially spaced from each other. After a predetermined radial relative movement between the outer surface and the inner surface, the cam rings rest on the inner surface or the outer surface and prevent any further radial relative movement.

The cam ring is provided, on the inside and outside, with support protuberances or cams, which are brought into contact, with a certain amount of play, with the outer surface and/or the inner surface. The height of the cams or the support protuberances is identical. That results under operating conditions in a reduced shaft offset, whereby the bearing application area of the bearing isolation is significantly increased. In addition, that solution, involving a cam ring, makes possible more economical manufacturing.

The play lies within a tolerance of 0.02 millimeters to 0.1 mm, whereby it should preferably be less than or equal to 0.1 mm.

Advantageously, all of the support protuberances have an identical amount of play relative to the respective outer surface and/or inner surface.

A radially-extending side surface is formed on at least one axial wall of the outer surface, and on at least one axial wall of the inner surface. And at least one support component is provided by means of which the side surfaces are supported opposite to each other.

On the outer surface and radially positioned relative to its radially-extending side surfaces is a sleeve with a basically U-shaped cross section, between which and the outer surface at least one cam ring is arranged.

The radial side surfaces of the outer surface rest against radial side surfaces of the inner surface, in an elastic and resilient manner and in an axial direction, by means of the basically radially running, arched sidewalls of the sleeve.

Attached to the outer surface and radially positioned relative to its radially-extending side surfaces is a spring sleeve that forms the cam ring, the spring sleeve having a basically U-shaped cross-section. The wall of the spring sleeve, which runs basically parallel to the axis, bulges radially outward.

The wall of the spring sleeve has at least two axially-spaced, circumferential radial undulations, and with an axial wavelength direction.

An annular region between the radial undulations extends as a circumferential recess in the outer surface.

The wall of the spring sleeve has at least one radial undulation with a wavelength direction running in the circumferential direction.

The radial undulations of the wall, the wavelength directions of which run axially and/or in the direction of the circumference, are of equal height.

The cam ring is formed of segments that extend over parts of the circumference of the inner surface and/or the outer surface.

Examples of advantageous embodiments of cam rings in accordance with the invention, and which can be used in the noise attenuation device in accordance with the invention, are described below.

A cam ring to surround at least a partial periphery of a circular cylindrical outer surface has spaced cams in the circumferential direction that are formed on the radial exterior and the radial interior, for permanent contact with the outer surface, and an inner surface that is concentric with the outer surface and is surrounded by it.

A cam ring with cams has a slit or a gap.

The cam ring can be produced by stamping and subsequent bending, which is extremely advantageous for economical manufacturing.

A further advantage for economical manufacturing is when a cam ring is composed of rectangular or round wire material.

In addition, it is advantageous for the support protuberances to be produced having an exact size by means of a transverse impact extrusion process.

The belt-driven conical-pulley transmission with the noise attenuation device in accordance with the invention, and the cam ring or rings in accordance with the invention, can be used for any kind of bearing application. They are advantageously used for roller bearings.

BRIEF DESCRIPTION OF THE DRAWINGS

The structure, operation, and advantages of the present invention will become further apparent upon consideration of the following description, taken in conjunction with the accompanying drawings in which:

FIG. 2 is a fragmentary cross-sectional view of an embodiment of a bearing support;

FIG. 3 is a cross-sectional view taken along the line 3-3 of FIG. 2;

FIG. 4 is a fragmentary cross-sectional view of another embodiment of a bearing support;

FIG. 5 is a cross-sectional view taken along the line 5-5 of FIG. 4;

DESCRIPTION OF THE PREFERRED EMBODIMENTS

Figure 1:
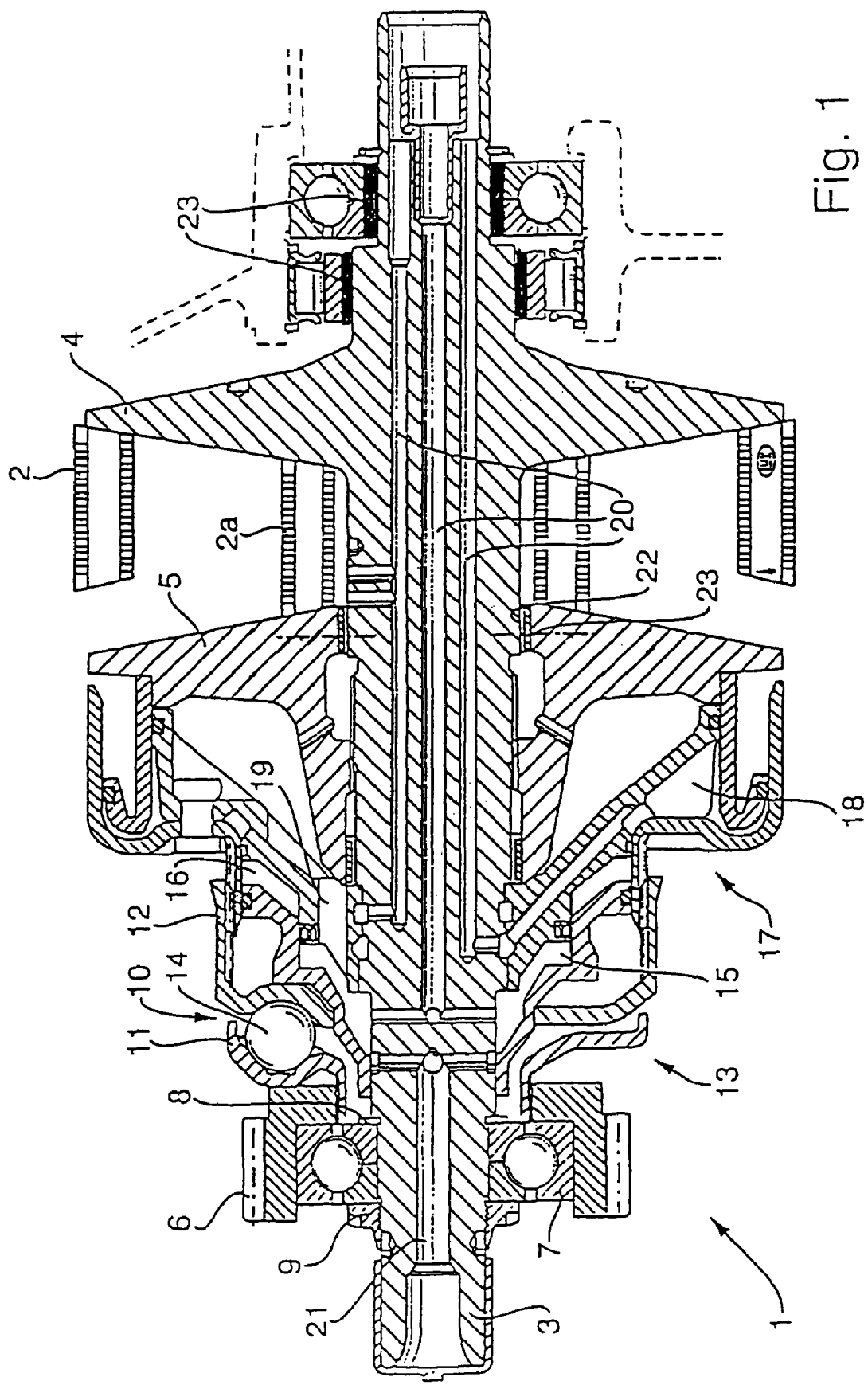
FIG. 1 is a cross-sectional view of a portion of a belt-driven conical-pulley transmission.

FIG. 1 shows only one part of a belt-driven conical-pulley transmission, specifically the part of the belt-driven conical-pulley transmission 1 that is driven by a drive motor, such as an internal combustion engine, and is located on the drive side or the input side. In a completely implemented belt-driven conical-pulley transmission, the input side part is associated with a complementary output side part of the continuously-variable, belt-driven conical-pulley transmission, whereby both parts are connected to each other by means of an endless torque-transmitting means, for example in the form of a plate-link chain 2 for transmitting torque. The belt-driven conical-pulley transmission 1 has a shaft 3 on the input side thereof, which, in the design shown is integrally formed with a fixed conical pulley 4. This axially-fixed conical pulley 4 is adjacent, in the axial longitudinal direction of the shaft 3, to an axially-displaceable conical pulley 5.

In the representation according to FIG. 1, the plate-link chain 2 is shown in a radially outer position, relative to the input side pair of conical pulleys 4, 5, which is achieved when the axially-displaceable conical pulley 5 in the drawing is displaced toward the right, which shifting movement of the axially-displaceable conical pulley 5 results in a radially outward movement of the plate-link chain 2, producing a change in the transmission ratio of the transmission to high speed.

The axially displaceable conical pulley 5 can also be displaced toward the left in the plane of the drawing, in a known manner, whereby in that position the plate-link chain 2 is at a radially inner position (which is represented by reference numeral 2a), which produces a transmission ratio of the belt-driven conical-pulley transmission 1 of low speed.

The torque provided by a drive motor (not shown) is introduced to the input side part of the belt-driven conical-pulley transmission shown in FIG. 1 by means of a gear 6 supported on the shaft 3. Gear 6 is supported on the shaft 3 by means of a rolling body in the form of a ball bearing 7, which receives axial and radial forces and which is secured to the shaft 3 by means of a disk 8 and a shaft nut 9. A torque sensor 10 is arranged between the gear 6 and the axially-displaceable conical pulley 5 and is associated with a spreader disk unit 13 provided with an axially-fixed spreader disk 11 and an axially-displaceable spreader disk 12. Arranged between the two spreader disks 11, 12 are rolling bodies, for example in the form of the balls 14 as shown.

A torque introduced through the gear 6 leads to the development of an angle of rotation between the axially-stationary spreader disk 11 and the axially-displaceable spreader disk 12, which leads to an axial displacement of the spreader disk 12 that is based on the presence of inclined ramps arranged thereon, on which the balls 14 roll, thus causing an axial offset of the spreader disks relative to each other.

The torque sensor 10 has two pressure chambers 15, 16, of which the first pressure chamber 15 is provided for the purpose of pressurizing with a pressure medium as a function of the transferred torque, and the second pressure chamber 16 is provided with a pressure medium as a function of the transmission ratio of the transmission.

For the production of the contact pressure for applying a normal force to the plate-link chain 2 between the axially-stationary conical pulley 4 and the axially-displaceable conical pulley 5, a piston/cylinder unit 17 is provided that has two pressure chambers 18, 19. The first pressure chamber 18 serves to increase or reduce the contact pressure that is applied to the plate-link chain 2 between the conical pulleys 4, 5, and is connected with the pressure chamber 15 of the torque sensor 10. The second pressure chamber 19 serves to change the force applied to the plate-link chain 2 as a function of the transmission ratio.

The shaft 3 has three channels 20 for supplying the pressure chambers with pressure medium from a pump (not shown). By means of an outlet side channel 21, the pressure medium can flow out of the shaft 3 and return to the circuit.

The pressurization of pressure chambers 15, 16, 18, 19 leads to a torque- and transmission-ratio-dependent displacement of the axially-displaceable conical pulley 5 on the shaft 3. For the purpose of accepting the displaceable conical pulley 5, the shaft 3 has centering surfaces 22 that serve as a sliding fit for the displaceable conical pulley 5.

As can readily be seen in FIG. 1, the belt-driven conical-pulley transmission 1 has a silencing device 23 in the region of each of the bearings of the conical pulley 4 on the shaft 3.

For that purpose the silencing device can have an annular body with an attenuation lining, or it can be composed of only an attenuation liner.

In accordance with FIG. 2, a bearing inner ring 22 surrounds a shaft (not shown) of a pair of conical pulleys in a belt-driven conical-pulley transmission. Between it and a bearing outer ring 44, that is arranged concentrically with it, roller bodies 66 are arranged so that components 22, 44, and 66 jointly form a roller bearing. It is to be understood that the outer surface of the bearing inner ring 22, on which the roller bodies 66 roll, can be formed directly by a suitably machined outer surface of the shaft (not shown). The bearing outer ring 44 is received in an annular recess of a bearing housing 88, for example a transmission housing, which, as shown on the right side of FIG. 2, is closed by a removable annular cover 110.

The outer surface of the bearing outer ring 44 is not directly supported by the wall of the annular recess, but by an intermediate arrangement of various annular components and a shell 112 that can optionally be set into the annular recess. More precisely, in the example shown four annular cam rings 118 are arranged between the outer surface 114 of the bearing outer ring 44 and the inner surface 116 of the shell 112, with stop rings 220 arranged between the cam rings 118 in order to ensure that an axial distance is maintained between them. Positioning rings 222 are provided on both axially outer sides.

The rigidity of the cam rings 118 is such as to enable the achievement of the desired rigidity of the bearing against radial displacement of the bearing shaft (not shown) by means of the four cam rings 118. As follows from FIG. 3, which is a detail view of FIG. 2 in the direction 3-3, the cam rings 118 are formed in such a way that they are constantly in contact with outer surface 114 and inner surface 116. The shell 112, which can be made of steel, for example, is optional and serves to prevent wear of the recess and/or bore of the bearing housing 88 and can be made of a light metal.

In the embodiment according to FIG. 2, positioning rings 222 are provided in the peripheral direction, axially outside the cam rings 118.

As is apparent from FIG. 3, the cam rings 118 are provided with inner and outer support protuberances 224, which are spaced from each other in the circumferential direction and are in constant contact with outer surface 114 and inner surface 116. The cam rings 118 are supported by the bearing housing 88, which gives rise to an identical support of the roller bearing.

FIGS. 4 and 5 show a structure corresponding substantially with that Of FIGS. 2 and 3 of the support or the uncoupling of the outer bearing ring 44 from bearing housing 88, by means of which the noise transmission from the roller bearing to the foundation is reduced. Adjacent outer protuberances 224 of cam ring 118a are circumferentially spaced along an arc defined by the angle φ.

Figure 6:
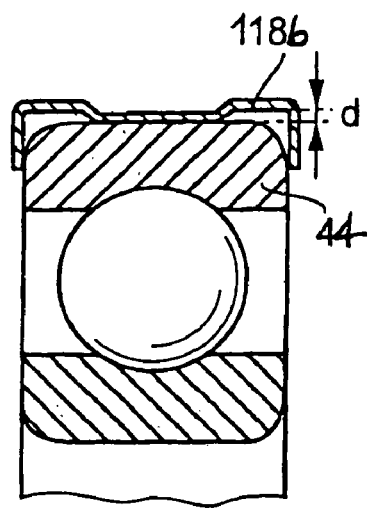
FIG. 6 is a fragmentary cross-sectional view of an embodiment of a cam ring.
Figure 7:
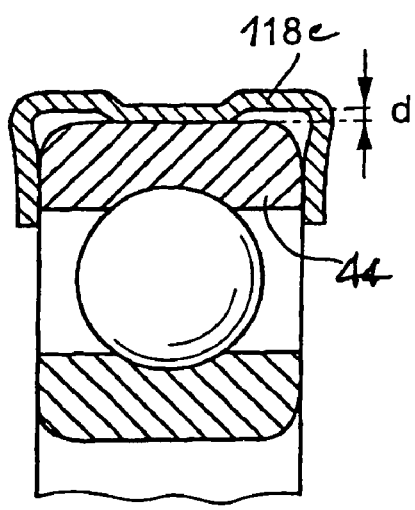
FIG. 7 is a fragmentary cross-sectional view of another embodiment of a cam ring.

In the embodiments in accordance with FIGS. 6 and 7, the outer surfaces of the bearing outer ring 44 have no recess or groove. The sidewalls of the cam ring 118b extend parallel to the sidewalls of the bearing outer ring 44, so that the cam ring, which is in the form of a spring sleeve, does not have the function of an axial spring. The cam ring 118c in FIG. 7, which is also in the form of a spring sleeve, has the additional function of an axial spring.

Figure 8:
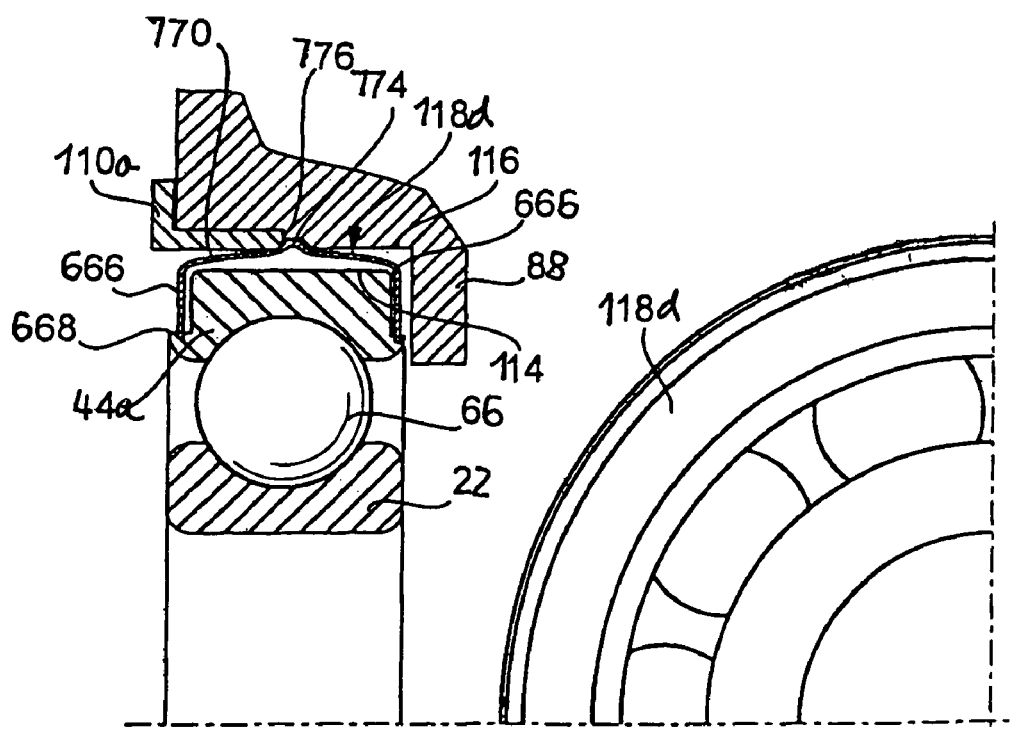
FIG. 8 is a fragmentary cross-sectional view of another embodiment of a bearing support and associated cam ring.

In FIG. 8, the left half of the figure is in longitudinal cross section and the right half of the figure shows a side view of an additional embodiment of a cam ring 118d in the form of a spring sleeve. The bearing outer ring 44a is surrounded by a spring sleeve 118d in the form of a thin-walled, spring steel sheet, with an essentially U-shaped overall cross section. The radially-extending sidewalls 666 are radially supported by a ring-shaped step 668 that is formed on the side surfaces of the outer ring 44a. Radial resilience is achieved by a crown or radially-outward bulge of the end wall 770 of the spring sleeve 118d. The basic rigidity can be controlled by the thickness of the sheet. The spring characteristic can usefully be chosen by selecting the nature of the curvature of the end wall, if necessary with several waves, and/or the contour of the sidewalls 666. For example, the spring characteristic can be controlled in such a way that the end wall 770 comes into contact with the outer surface of the outer ring 44a after a certain radial deformation. Furthermore, an axial resilience of the spring sleeve 118d can be controlled by appropriate formation of the sidewalls 666 and the adjacent side surfaces of the outer bearing ring 44a. By asymmetrical bending in their plane, the radial sidewalls 666 can also affect the radial resilience of the spring sleeve 118d.

By having the radial sidewalls 666 extend far over and/or around the outer ring 44a, on one hand the radial requirement for space is minimized, and on the other hand a relatively great degree of axial resilience is made possible. If necessary, slippage of the sidewalls 666 from the ring-shaped step 68 can be prevented by a suitable undercut. The spring sleeve 118d need not extend as a single piece over the entire circumference of the outer ring 44. It can be made in the form of two circumferential segments. Retention of the spring sleeve 118d in the assembled condition is ensured by the included boring or recess in the bearing housing 88, whereby through the crowned shape of the spring sleeve its mounting is facilitated.

For the axial support of the bearing, a circumferentially-extending radial protuberance 774 of the spring sleeve 118d can be provided, which is received in an annular groove 776 in the bearing housing 88. The annular groove 776 can be formed by a gradation on the inner surface 116 of the bearing housing 88, which is closed on the side by the annular cover 110a.

Figure 9:
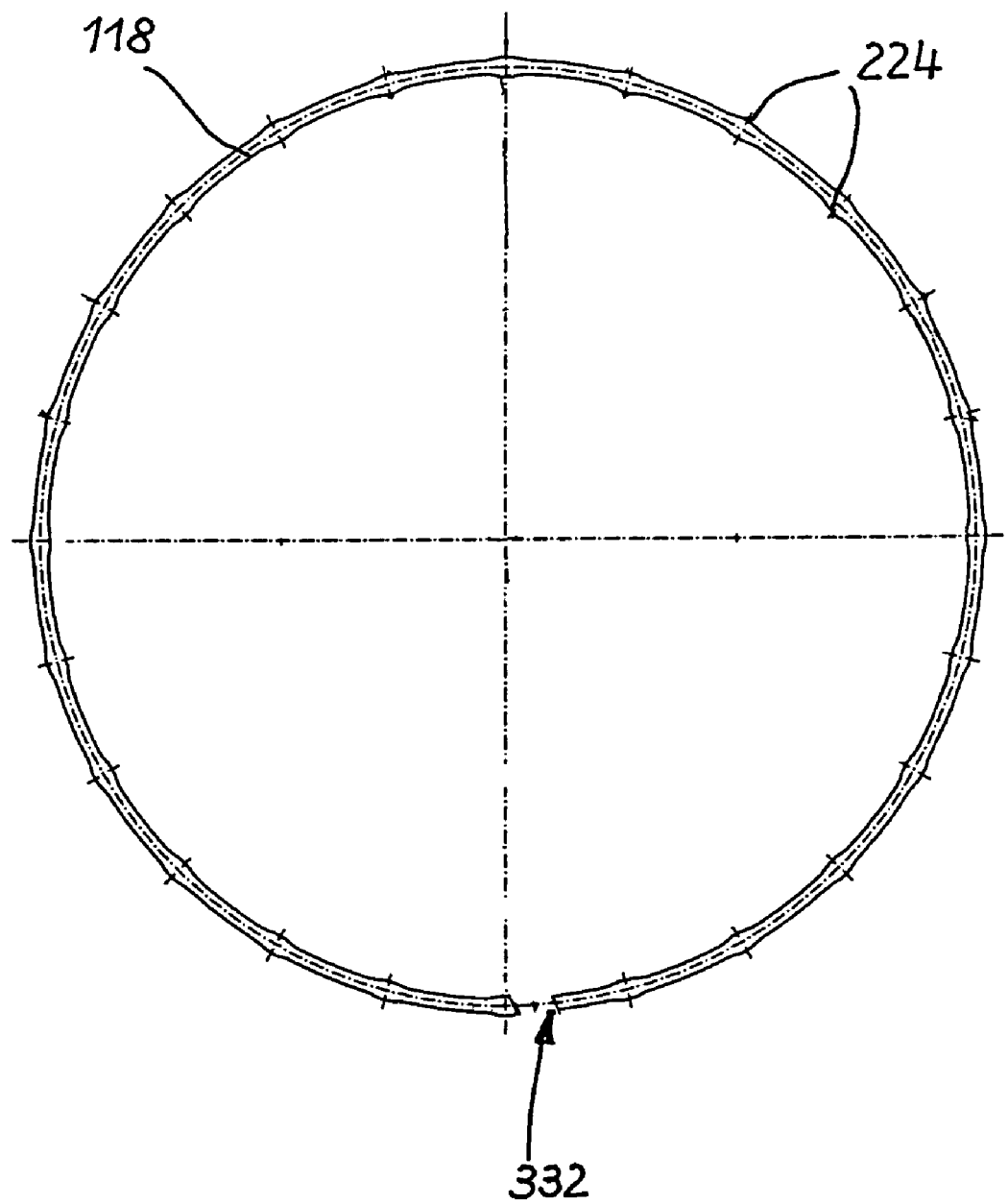
FIG. 9 is an elevational view of a cam ring.

FIG. 9 shows a possible embodiment of a cam ring in which the inner and outer protuberances 224 are arranged to lie opposite each other. An additional advantageous solution can also be that the protuberances 224 are arranged opposite each other, but offset at a specified distance. A gap 332 is provided to facilitate assembly of the cam ring over the bearing outer ring.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A transmission noise attenuation device for a bearing assembly of a belt-driven conical-pulley transmission having a chain acting as an endless torque-transmitting means, said bearing assembly comprising:

a bearing for rotatably supporting a shaft and including a bearing outer ring having a cylindrical outer surface;

a bearing housing having a housing inner surface, wherein the bearing housing receives and supports the bearing; and a plurality of coaxial, axially spaced cam rings positioned between and in contact with the housing inner surface and with the bearing outer ring outer surface, wherein the cam rings are radially elastically deformable to allow a limited radial movement between the bearing housing inner surface and the bearing outer ring outer surface and include inner, circumferentially-spaced cam surfaces that contact the bearing outer ring outer surface and outer, circumferentially-spaced cam surfaces that contact the bearing housing inner surface, wherein the inner and outer cam surfaces are positioned radially opposite each other, wherein the inner and outer cam surfaces are in constant contact with the bearing outer ring outer surface and the bearing housing inner surface, respectively, and wherein the limited radial movement is between 0.1 mm and 0.02 mm.

2. A transmission noise attenuation device in accordance with claim 1, wherein at least two coaxial cam rings are axially spaced from each other by an intervening, coaxial stop ring, and wherein after a predetermined radial relative movement between the bearing outer ring outer surface and the bearing housing inner surface, the cam rings contact at least one of the bearing housing inner surface and the bearing outer ring outer surface to prevent additional radial relative movement between the bearing outer ring and the bearing housing.

3. A transmission noise attenuation device in accordance with claim 1, wherein each of the cam surfaces has an equal amount of limited movement relative to the respective adjacent outer surface and inner surface.

4. A transmission noise attenuation device in accordance with claim 1, wherein the bearing outer ring includes a radially-extending side surface and the bearing housing includes a complementary radially-extending side surface, and wherein at least one support member is provided for supporting the radially-extending side surfaces against each other.

5. A transmission noise attenuation device in accordance with claim 1, wherein the cam rings are discontinuous segments that extend partially over the bearing outer ring outer surface.

6. A cam ring for surrounding at least a part of the circumference of a cylindrical outer surface, said cam ring comprising: a ring-shaped member having a plurality of inner, circumferentially-spaced cam surfaces formed on a radially inner surface, and a plurality of outer, circumferentially-spaced cam surfaces formed on a radially outer surface of the cam ring, wherein the inner cam surfaces are in constant contact with an inner cylindrical surface and the outer cam surfaces are in constant contact with an outer cylindrical surface that surrounds and is concentric with the Inner cylindrical surface, and by limited elastic deformation of the cam ring allow limited radial movement between the inner cylindrical surface and the outer cylindrical surface, wherein the inner and outer cam surfaces are positioned radially opposite each other.

7. A cam ring in accordance with claim 6, including a slit that defines a circumferential gap in the ring-shaped member.

8. A cam ring in accordance with claim 6, wherein the cam ring is manufactured by stamping and subsequent forming.

9. A cam ring in accordance with claim 6, wherein the cam ring is formed from rectangular or round wire material.

10. A cam ring in accordance with claim 6, wherein the cam surfaces are produced to an exact size by means of a transverse impact extrusion process.

11. A cam ring in accordance with claim 6, wherein the cam surfaces are produced to an exact size by means of a transverse impact extrusion process.

12. A cam ring for surrounding at least a part of the circumference of a cylindrical outer surface, said cam ring comprising: a ring-shaped member having inner, circumferentially-spaced cam surfaces formed on a radially inner surface, and outer, circumferentially-spaced cam surface formed on a radially outer surface of the cam ring, wherein the inner and outer cam surfaces are in contact with an inner cylindrical surface and with an outer cylindrical surface that surrounds the inner cylindrical surface after a predetermined elastic deformation of the cam ring resulting in radial displacement of the outer cam surfaces relative to the inner cam surfaces, wherein the inner and outer cam surfaces are positioned radially opposite each other.

13. A cam ring in accordance with claim 12, including a slit that defines a circumferential gap in the ring-shaped member.

14. A cam ring in accordance with claim 12, wherein the cam ring is manufactured by stamping and subsequent forming.

15. A cam ring in accordance with claim 12, wherein the cam ring is formed from rectangular or round wire material.

* * * * *